United States Patent [19]
Thuswaldner

[11] Patent Number: 5,285,567
[45] Date of Patent: Feb. 15, 1994

[54] MACHINE FOR APPLYING FASTENER DEVICES

[75] Inventor: Hermann Thuswaldner, Gamleby, Sweden

[73] Assignee: Barracuda Technologies AB, Gamleby, Sweden

[21] Appl. No.: 877,884

[22] Filed: May 1, 1992

Related U.S. Application Data

[60] Division of Ser. No. 784,663, Oct. 24, 1991, Pat. No. 5,163,552, which is a continuation of Ser. No. 476,457, Jun. 8, 1990, abandoned.

[30] Foreign Application Priority Data

Oct. 12, 1988 [SE] Sweden ............................ 8803629-8

[51] Int. Cl.⁵ ............................................. B23P 21/00
[52] U.S. Cl. ....................................... 29/786; 29/788; 29/818; 29/243.53
[58] Field of Search ................. 29/525.1, 525.2, 77, 29/786, 787, 788, 809, 818, 243.53, 243.54; 227/15, 18

[56] References Cited

U.S. PATENT DOCUMENTS

| | | | |
|---|---|---|---|
| 2,922,162 | 1/1960 | Cohn | 227/18 |
| 3,265,275 | 8/1966 | Wilson | 227/18 |
| 3,612,381 | 10/1971 | Schmidt | 227/18 |
| 3,750,925 | 8/1973 | Schmidt et al. | 227/18 |
| 3,969,808 | 7/1976 | Goodsmith et al. | 29/818 X |

Primary Examiner—Timothy V. Eley
Attorney, Agent, or Firm—Lee, Mann, Smith, McWilliams, Sweeney & Ohlson

[57] ABSTRACT

The invention relates to the joining of one web, e.g., of camouflage material to a carrier net or the like with the aid of fastener devices comprising male fastener parts (10) provided with pins or like elements which are hammered into complementary holes in female fastener parts (12). The female and male fastener parts are banded together by means of plastic wires moulded along the sides of the fastener parts and are separated subsequent to being brought to a fastener applying position (40) from a respective magazine (30,41). the male fastener parts are banded with the pins positioned in the direction of the band, while the holes provided in the female fastener parts face at right angles to the band direction. The bands are advanced by means of pawl-mechanisms (32-36 and 43-48) respectively). The invention relates to the banded fastener devices, a method of manufacturing the devices and a machine for applying the devices.

3 Claims, 5 Drawing Sheets

FIG. 5

PROD. DIR ↑

20 × 20 MESH = 1,7 × 1,7 m = 2,89 m$^2$

= 105 CLIPS = 36 CLIPS/m$^2$

= 11 APPARATUS

LENGTH MEASUREMENT 2 × 84 mm

MACHINE FOR APPLYING FASTENER DEVICES

This application is a division of U.S. patent application Ser. No. 784,663, filed Oct. 24, 1991, now U.S. Pat. No. 5,163,552, which in turn is a continuation of U.S. patent application Ser. No. 476,457, filed Jun. 8, 1990, now abandoned.

The present invention relates to fastener devices intended for fastening a relatively weak material to a stronger material, particularly to a supporting net structure. The invention has particular application in the manufacture of camouflage material, in which case the relatively weak material may be an apertured or leaf-cut plastic material coated with camouflage paint, or alternatively may comprise loose, non-connected parts which are joined with a net length such as to form a coherent structure.

So-called camouflage nets are either joined with the aid of an adhesive paste or glue or with the aid of special binding clips, these latter fastening means often being applied with the use of hand-held apparatus, which is a highly laborious and demanding task. The use of fasteners, however, is often preferred to gluing, for strength reasons. A combination of fasteners and adhesive is sometimes also used.

An object of the present invention is to produce a fastener system which will enable strong and reliable fastening of the materials to be achieved. The fastener applied should be capable of embracing a net thread or net cord and also of achieving a firm grip around the material affixed to the net. In the case of camouflage structures, the fasteners should be made of a plastic material, therewith to avoid reflection of radar signals.

The object of the present invention and the advantages afforded thereby are achieved with banded male and female type fastener devices, these banded fasteners being produced by a method according to the invention and applied or fitted by means of an apparatus according to the invention.

One basic concept of the invention is that the male and female fastener parts of the fastener devices are joined or banded separately in individual strips or bands, in a manner to enable the male and female fastener parts to be removed individually from their respective bands when fixing the fastener devices around a net thread and to the material which is to be fastened to the net. According to one preferred embodiment, the male fastener parts comprise two outwardly projecting pins or like elements which are pointed at their free ends sufficiently to enable said pins to penetrate the material placed on the net and which are joined by a bridge part which extends perpendicular to the pins of said male fastener parts. The female fastener parts preferably comprise a flat part in which two holes are provided, the spacing between said holes being equal to the distance between the pins of the male fastener parts. Fastening is achieved by pressing the pins into respective holes in the female fastener parts and retaining said pins in the holes. Retention of the pins in the holes of the female fastener parts can be achieved with the aid of barbs or hooks formed on the pins of the male fastener parts. Alternatively, the pins of said male fastener parts can be deformed as by riveting, subsequent to being inserted into the holes. When the male fastener part of the fastener part is made of a plastic material, riveting of the pins of said male fastener parts can be effected by heat and pressure, or by abrasive deformation of the pins, or in some similar manner.

For the purpose of obtaining banded fastener devices which can be manufactured readily in practice, which will take-up little space and which can be handled readily in banded form on storage rolls or reels, the male fastener parts are positioned so that their respective pins extend in the plane of the band. Although it is possible to position the outwardly extending pins at right angles to the direction of band movement, it is preferred in accordance with the invention to position said pins in the direction of the band, inter alia for reasons of manufacture.

In the case of one preferred embodiment, the two bands are each formed around two edge-laid wires. According to one suitable method of manufacture, the bands of fastener devices are produced by injection moulding in a mould constructed for producing a plurality of male or female fastener parts, wherein the two wires are drawn through the mould and wherein, subsequent to having produced the number of male or female fastener parts determined by the mould, the resultant bands are withdrawn from the open mould and further lengths of the two mutually parallel wires are provided with respective male and female fastener parts, said mould having a dividing plane which extends parallel to and substantially coincidental with the wires located in the mould. Successive moulding operations will provide, in this way, long bands of fastener devices which can be rolled-up and placed on magazine bobbins. The wires are located in the immediate proximity of the edges of the bands and respective male and female fastener parts can be disengaged from respective bands, by drawing said fastener parts past two knives or cutting blades mounting one on each side of the wires and being operative to sever said wires, together with a small part of surrounding plastic. Glass-fibre filled thermoplastic injection moulding compounds based on, e.g., polyamide or polypropene is a suitable material for use in this connection.

The female fastener parts are positioned in the band such that the holes formed in said parts will face at right angles to the band direction and such that the holes will preferably form pairs of holes with a connecting line which is perpendicular to the band direction, for both manufacturing and fastener-fitting reasons.

In operation, the inventive fastener-applying machine brings a male and a female fastener part located on respective sides of the combined web combination to be joined together, to a joining station which incorporates what can be referred to as a die and hammer, the die on the one side and the hammer on the other accommodating a female part and a male part respectively which, when disengaged from the band or while being disengaged therefrom, are pressed towards one another, so that the pins on the male fastener part will penetrate said material and straddle a net thread and pass into the holes provided in the female fastener part, whereafter said pins are secured in said holes.

According to one preferred embodiment, the band of female fastener parts is moved to the die parallel with the direction of movement of the web combination and the outermost female fastener part of said band is disengaged therefrom at the location where a die is positioned. The band of male fastener parts, however, is preferably moved with the longitudinal axis of the band at right angles to the direction of movement of the web combination, with the pointed ends of the pins pointing towards the positions of the holes in the female fastener part placed in the die.

The two bands are moved from their respective storage locations, in which they are stored in rolls, via slide paths or drums and are suitably brought to respective die and hammer working positions, one by one, and therewith moved past pairs of cutting blades which free the male and female fastener parts from the edge wires holding the band together.

When producing broad webs, it may be appropriate to position several fastener applying machines more or less side-by-side centrally of the threads of a net which is advanced in the same direction as the long direction of the net-mesh threads in the travel direction of the web-like net. The net is preferably caused to run over separate net-guiding rollers of known kind having pyramidal bosses spaced evenly around the peripheries thereof and in the long direction of the rollers, for engagement in the open-stretched meshes of the net, wherewith the meshes are guided so that their defining threads will be located with sufficient precision at the working heads of the fastener-applying machine.

The invention will now be described in more detail with reference to an exemplifying embodiment thereof.

FIG. 5 illustrates suitable locations of fastener devices in a machine according to FIG. 1.

Figure 1:
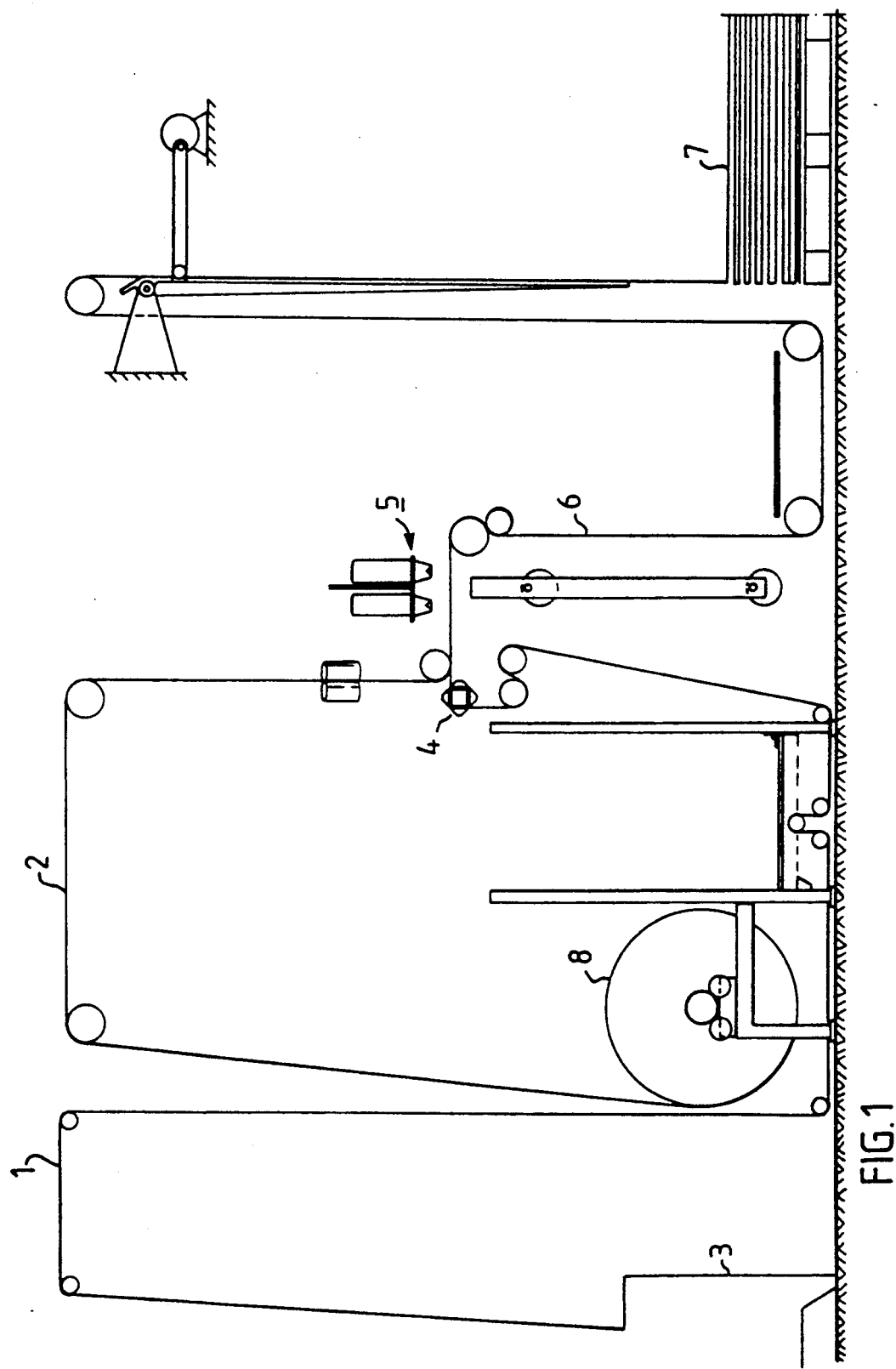
FIG. 1 illustrates schematically and in side view a machine for manufacturing a camouflage net structure.

FIG. 1 illustrates a plant for the manufacture of camouflage material comprising a net base 1 and camouflage material 2. Although the purpose of the invention is to achieve mutual attachment of the net 1 and the material 2 at the location referenced 5, an overall description is nevertheless able to illustrate a significant application. Net of the kind intended is normally delivered with the meshes stretched out and pulled diagonally together, so that the net has the form of a string, and is placed in a box, such as indicated at 3. The net is then withdrawn from the box and opened out to form an elongated web 1. (In practice, the box 3 is placed on one side of the main web path and the first part of the net path will form an angle of 90° C. to the main net path.)

When joining together the net and the camouflage material, it is necessary to have full control of the meshes. This control is achieved by passing the net over a roller 4 of special configuration and of a known kind, provided with bosses which engage and fit into the meshes of the net, such that the net will pass to the joining station 5 with the net meshes fully open. Camouflage foil is drawn, at the same time, from a roll or reel 8 and placed on top of the net 1, at a location immediately prior to the location of the joining station 5. The foil may be imperforate or leaf-cut, in a known manner. The camouflage composite 6 is then removed from the joining station 5 and placed in successive folds on a loading pallet, with the aid of means known within the textile industry and forming no part of this invention.

Figure 2:
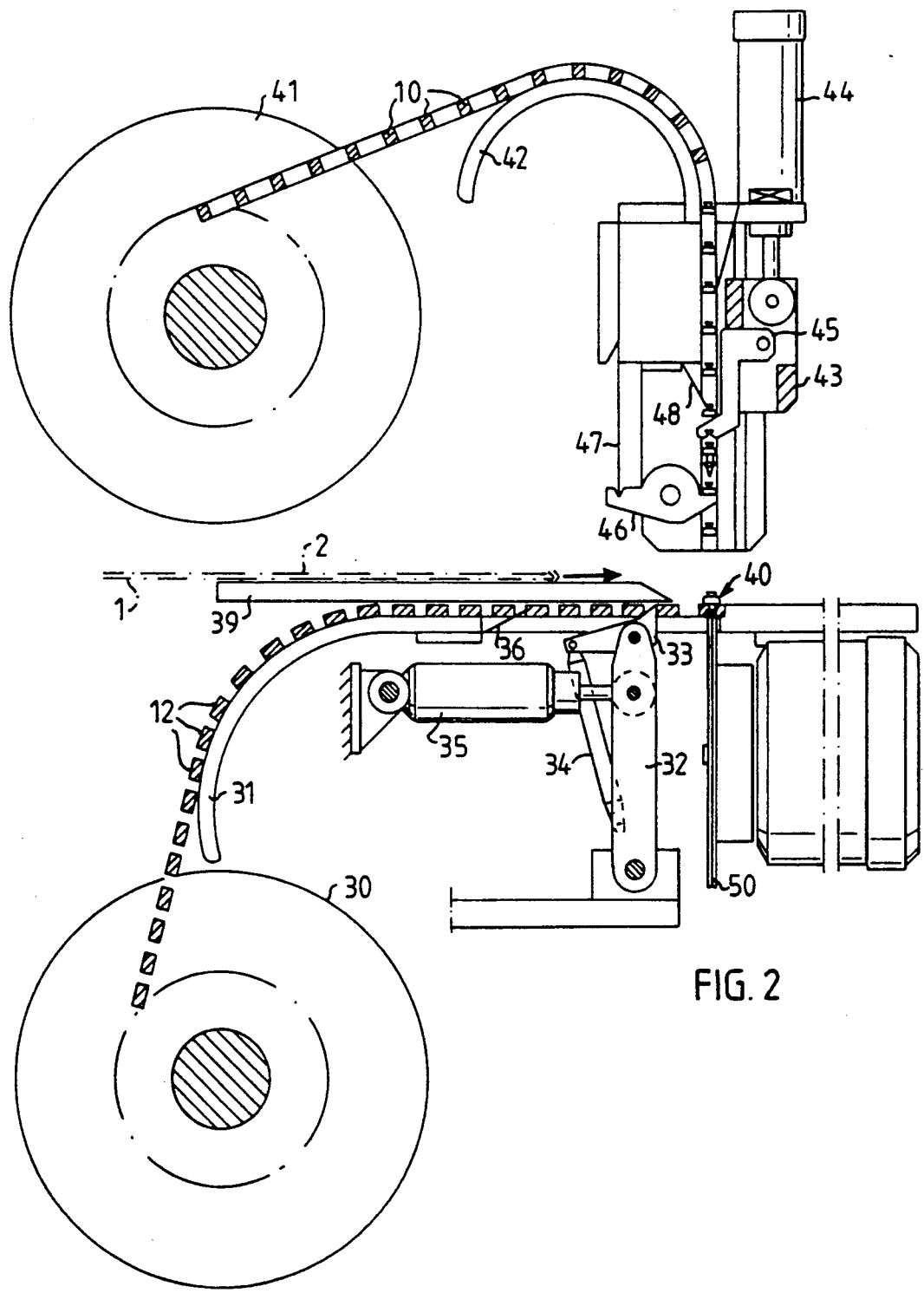
FIG. 2 is a detailed side view of a fastener applying machine.
Figure 3:
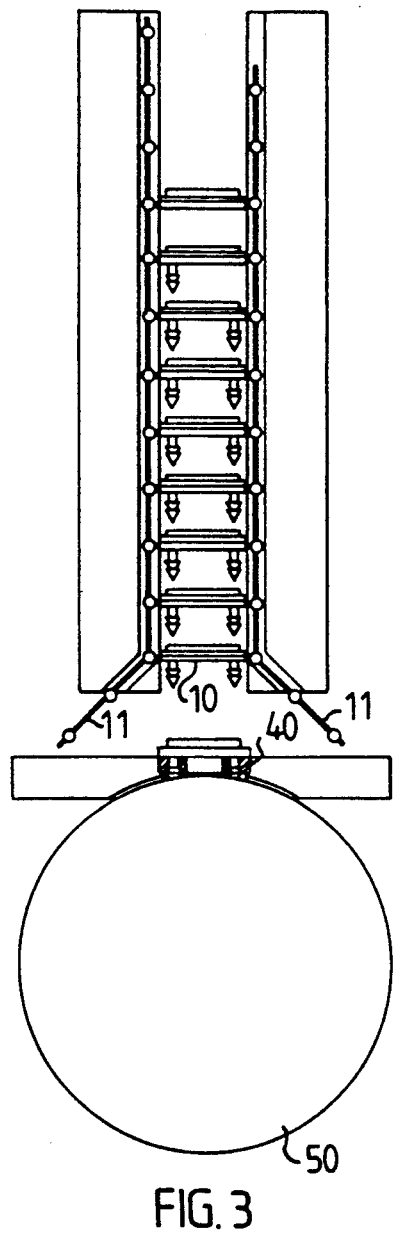
FIG. 3 is a detailed front view which illustrates the forward feed of a male fastener part according to FIG. 2.
Figure 4:
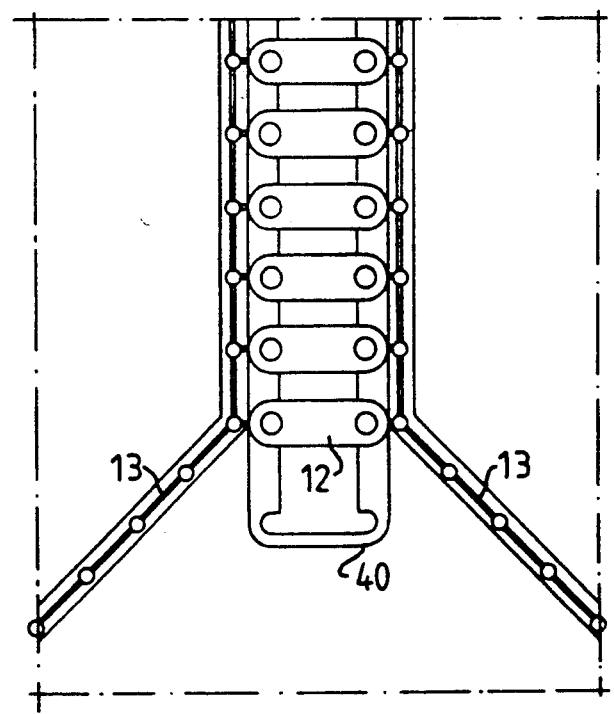
FIG. 4 illustrates the application of a female fastener part corresponding to FIG. 3.
Figure 6:
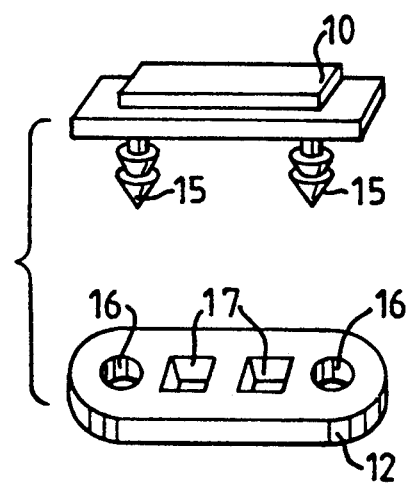
FIG. 6 illustrates schematically and in perspective a male fastener part and a female fastener part separated from their respective bands.

The manner in which the net and camouflage foil are joined together in accordance with the invention is illustrated in FIG. 2 and also in the enlarged views of FIGS. 3 and 4. The fastening devices themselves are shown, in principle, in FIG. 6 and comprise a male fastener part 10 and a female fastener part 12. The male fastener part has outwardly extending pins 15 which are intended to be pressed into corresponding holes 16 formed in the female fastener parts. The pins 15 are pointed and may be provided with barbs, hooks or like elements. The female fastener part may be provided with a slot 17, so as to enhance the elasticity or suppleness of said part.

In accordance with the invention, the male and female fastener parts are banded separately with the aid of respective wires 11 and 13 or the like, as shown in FIGS. 3 and 4 respectively. As before mentioned, the fastener devices are produced suitably by injection moulding, in which the wires are drawn through respective moulds constructed to produce a limited number of fastener devices with each moulding operation. One band of each type is shown in FIGS. 3 and 4 respectively, from which it will be seen that the pins 15 on the male fastener parts extend in the plane of the band and in its direction of movement, whereas the holes formed in the female fastener parts are positioned at right angles to the band direction.

It will be noticed from FIGS. 3 and 4 that the bands are advanced towards a die 40 and are there disengaged from respective wires 11 and 13, with the aid of knives or cutting blades. The plane of FIG. 4 is perpendicular to the plane of FIG. 3. FIG. 3 illustrates the stage of operation in which a male fastener part has just been hammered into a female fastener part and a rotating abrasive wheel 50 is in the process of grinding and deforming the ends of the pins of the male fastener parts protruding from the female fastener parts, such as to form rivet-head like configurations.

The machine illustrated in FIG. 2 performs the working operations described with reference to FIGS. 3 and 4.

The banded female fastener parts are taken from the bobbin 30 and drawn over a curved guide plate 31 and up under a cover plate 39, over which the webs 1, 2 move, and up to a fastener-applying location left exposed by the cover plate. The banded female fastener parts are advanced by means of a pneumatic piston-cylinder device 35 which is operative to pivot a pivotal arm 32. Mounted on the free end of the arm 32 is a dogging element or pawl 33 which is spring loaded by a tension spring 34 and which, in one direction of movement of the dogging element, dogs the female fastener parts forwards, in the manner of a ratchet pawl, towards the die position 40. The band is held stationary by a blade spring 36 upon the return movement of the dogging element, therewith preventing the band from being moved rearwardly by the dogging element 33 as it returns.

The similarly banded male fastener parts 10 are drawn from a bobbin 41 onto a curved guide plate 42 and from there to a feeding and fastening mechanism. This mechanism includes a slide 43 which is driven up and down by a hydraulic piston-cylinder device 44, and a hammer 45 which, similar to the dogging element, can pivot solely in one direction. The dogging element/hammer 45 grips the outermost male fastener part in said band from behind, and the male fastener part is subsequently pushed firmly into the hammer by means of a fastener anvil 46. The anvil 46 is pivotally mounted and is acted upon by a spring means 47, and will thus be pivoted to one side as the slide continues to move downwards. The wires holding the male fastener part in the band are then severed with the aid of knives so as to disengage the male fastener part from said band, whereafter the pins on the male fastener part are driven into corresponding holes in the underlying female fastener part. The ends of the pins protruding from the female fastener part are then deformed by the abrasive wheel 50, so as to secure the male and female fastener parts together, after which the slide returns to its upper working position. The band is held in position by a spring 48 and consequently the pivotal dogging element/hammer will be moved to one side and subsequent to having turned and being restored to its previous position by spring means is able to grip a further male fastener part in a pawl-like manner and repeat the aforesaid procedure.

The piston-cylinder devices 35 and 44 are, naturally, controlled in sequence, in dependence on the forward feed of the webs 1 and 2, this control being well within the ability of one skilled in this art and need not therefore be described here.

The described machine is normally capable of applying only one row of fastener devices, and although the machine may be constructed so that it can move in the direction of the width of the webs 1,2 it is preferred to position a plurality of such machines in a manner which will enable the whole of the web to be provided with fastener devices.

FIG. 5 illustrates one example of such positioning of fastener devices in a so-called quincuncial configuration. The net has a width of 1.7 m and accommodates a 20 mesh width. Eleven fastener-applying machines are positioned uniformly so that each alternate long thread in the net can be fastened. By causing the fastener-applying machines to work rythmically in two groups and at a distance for each group in the web direction corresponding to two mesh lengths, there is obtained a regular fastener-device structure with 36 fastener devices per square meter. As indicated in FIG. 1, it is appropriate, in this case, to arrange the eleven machines in two rows and to activate said machines simultaneously, while allowing the web to be advanced with an interval of two mesh lengths between the activation of said machines. A suitable machine speed may be 4 m/minute, resulting in the application of almost 23 fastener devices per minute by each fastener-device applying apparatus.

Figure 7:
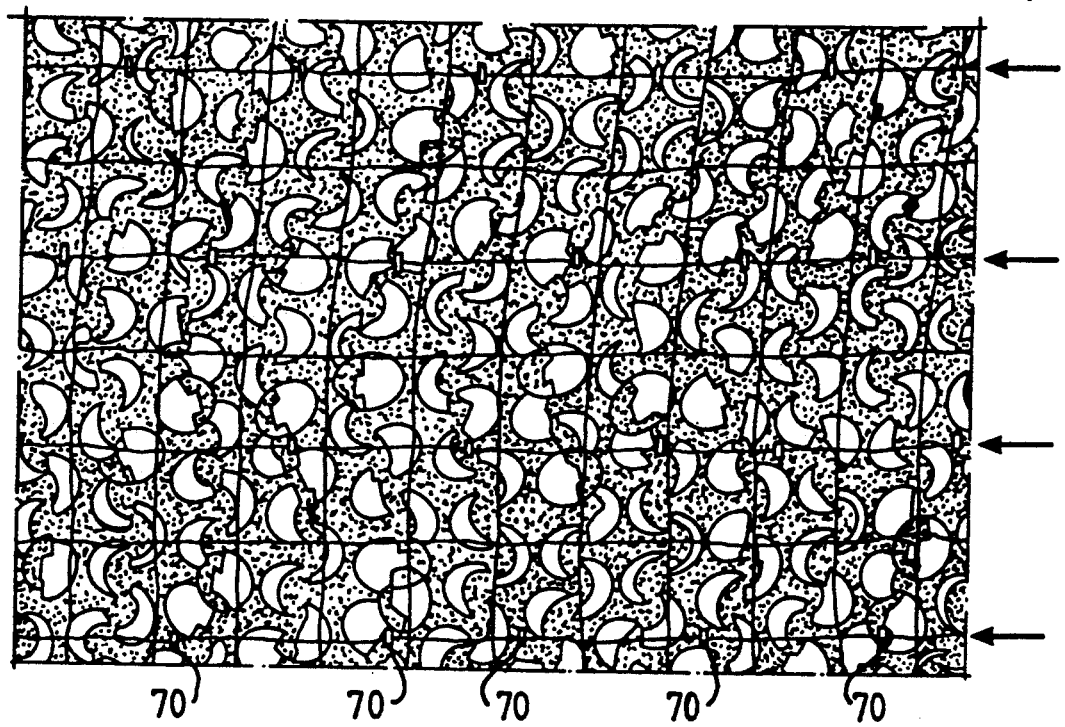
FIG. 7 illustrates an actual camouflage net structure having affixed thereto a covering of leaf-cut plastic foil.

FIG. 7 illustrates a camouflage net structure comprising a leaf-cut cover applied to a net. Each alternate net thread, marked with arrows on the left of the Figure, is provided with fastener devices according to the invention. Such fastener devices 70 are indicated at the bottom of the Figure. The fastener devices are arranged in a quincuncial configuration, similar to the arrangement illustrated in FIG. 5.

What is claimed is:

1. A machine for applying fastener devices in a manner to join plastic film to a reinforcing net, having means for advancing at least two webs to be joined one to the other, including a first supply on one side of webs of banded female fastener parts, and a second supply for banded male fastener parts on an opposite side of said webs, wherein the supply for banded female fastener parts includes a first magazine (30), a path (31) for advancing female fastener parts from the first magazine to a fastener anvil (40) provided with a counter-force surface, feed means (32-36) for advancing female fastener parts (12) to the anvil (40) one at a time, means for disengaging female fastener parts (12) singly from the female fastener band, wherein the supply for banded male fastener parts includes a second magazine (41), a path (42) for advancing male fastener parts from the second magazine (41) to a position opposite the fastener anvil, wherein the male fastener parts (10) are provided with elements (15) which extend outwardly in the band of male fastener parts, a reciprocatingly movable slide (43), and a pivotable hammer and feed device (45) which is pivotally mounted adjacent the slide and operative in one direction of movement to feed an outermost male fastener part (10) in said band towards said fastener anvil and to disengage said fastener part from said band and press the pins of said male fastener part through a female fastener part located in the anvil (40) and at the same time penetrating material joined to the net, and wherein in the second movement direction the hammer and feed device is swung away from the band so as to feed a further male fastener part (10).

2. A machine according to claim 1, in which the hammer and feed device of the slide (43) has a retaining part for releasably retaining male fastener parts (10), and in that arranged in the path travelled by the retaining part during movement of the slide is a spring-loaded (47), pivotal anvil means (46) for the insertion of the male fastener parts while in said retained position.

3. A machine according to claim 1, in which there is mounted beneath the anvil means an abrasion device (50) for deforming the ends of the pins subsequent to penetrating the female fastener parts.

* * * * *